(12) United States Patent
Thevenod (10) Patent No.: US 9,046,054 B2
(45) Date of Patent: Jun. 2, 2015

(54) HEAT ENGINE WITH EXTERNAL HOT SOURCE

(76) Inventor: Frédéric Thevenod, Paris (FR)

( * ) Notice: Subject to any disclaimer, the term of this patent is extended or adjusted under 35 U.S.C. 154(b) by 1011 days.

(21) Appl. No.: 12/440,310

(22) PCT Filed: Sep. 11, 2007

(86) PCT No.: PCT/FR2007/001466
§ 371 (c)(1),
(2), (4) Date: May 18, 2010

(87) PCT Pub. No.: WO2008/031939
PCT Pub. Date: Mar. 20, 2008

(65) Prior Publication Data
US 2011/0041491 A1    Feb. 24, 2011

(30) Foreign Application Priority Data
Sep. 11, 2006    (FR) ..................... 06 07933

(51) Int. Cl.
| | |
|---|---|
| *F01K 27/00* | (2006.01) |
| *F02G 3/00* | (2006.01) |
| *F02G 1/00* | (2006.01) |
| *F02B 73/00* | (2006.01) |
| *F02G 5/02* | (2006.01) |

(52) U.S. Cl.
CPC . *F02G 1/00* (2013.01); *F02B 73/00* (2013.01); *F02G 5/02* (2013.01); *F02G 2270/90* (2013.01); *Y02T 10/166* (2013.01)

(58) Field of Classification Search
USPC ............ 60/614–624, 650, 682, 508, 518, 570
See application file for complete search history.

(56) References Cited

U.S. PATENT DOCUMENTS 3,092,971 A * 6/1963 Stivender ........................ 60/657
3,180,178 A    4/1965 Brown et al.
(Continued)

FOREIGN PATENT DOCUMENTS

DE    40 42 305 A1    7/1992
DE    101 43 342 A1    4/2003
(Continued)

OTHER PUBLICATIONS

Stone, Automotive Engineering Fundamentals (2003).*
(Continued)

*Primary Examiner* — Thomas Denion
*Assistant Examiner* — Steven D Shipe
(74) *Attorney, Agent, or Firm* — Greer, Burns & Crain, Ltd.

(57) ABSTRACT

A heat engine with external hot source in which the engine has at least one variable volume working chamber for a working gas, and a distribution mechanism that connects this chamber to a cold input from an energy receiving path during an outgoing transfer phase and to a hot output of the energy receiving path during an incoming transfer phase, the energy receiving path being intended to heat the working gas outside the chamber on contact with the external hot source, wherein the distribution mechanism is timed in such a way as to: maintain pressure in the energy receiving path; during stable operation, connect the working chamber with the cold input from the energy receiving path whilst the pressure in the chamber is lower than the pressure in the energy receiving path.

26 Claims, 7 Drawing Sheets

(56) References Cited

U.S. PATENT DOCUMENTS

| | | | |
|---|---|---|---|
| 3,797,247 A * | 3/1974 | Schwartzman | 60/682 |
| 4,057,040 A * | 11/1977 | Wax | 123/46 R |
| 4,121,423 A * | 10/1978 | Querry et al. | 60/616 |
| 4,159,699 A * | 7/1979 | McCrum | 123/58.8 |
| 4,520,628 A * | 6/1985 | Carlqvist | 60/616 |
| 4,562,796 A * | 1/1986 | Eickmann | 123/65 BA |
| 4,574,590 A * | 3/1986 | Jones | 60/676 |
| 4,754,606 A * | 7/1988 | Nam | 60/616 |
| 4,962,645 A * | 10/1990 | Morgan | 60/682 |
| 5,325,824 A * | 7/1994 | Wishart | 123/72 |
| 5,329,757 A * | 7/1994 | Faulkner et al. | 60/776 |
| 6,672,063 B1 * | 1/2004 | Proeschel | 60/616 |
| 7,448,213 B2 * | 11/2008 | Mitani | 60/616 |
| 8,713,939 B2 * | 5/2014 | Tsuchino et al. | 60/618 |
| 2001/0001362 A1 * | 5/2001 | Gray, Jr. | 60/616 |
| 2004/0099887 A1 * | 5/2004 | Hazelton | 257/232 |
| 2008/0006032 A1 * | 1/2008 | Robinson | 60/616 |
| 2008/0141921 A1 * | 6/2008 | Hinderks | 114/274 |
| 2008/0216480 A1 * | 9/2008 | Harmon et al. | 60/670 |
| 2010/0257862 A1 * | 10/2010 | Howes et al. | 60/682 |

FOREIGN PATENT DOCUMENTS

| | | |
|---|---|---|
| FR | 2 673 979 | 9/1992 |
| FR | 2 738 596 | 3/1997 |
| GB | 1081499 | 8/1967 |
| JP | 2004 270625 | 9/2004 |

OTHER PUBLICATIONS

Stone, Automotive Engineering Fundamentals.*
Automotive Engineering Fundamentals, 2004.*

* cited by examiner

HEAT ENGINE WITH EXTERNAL HOT SOURCE

The present invention relates to a heat engine with external hot source, in particular an exhaust heat recovery hot source, for applications on all types of vehicle, whether terrestrial, marine or airborne.

The operation of conventional hot source heat engines is above all effective when the hot source is at a high temperature. Their performance declines however when the temperature of said hot source is moderate, as is the case of the exhaust gases from internal combustion engines.

Internal combustion engines have relatively modest energy output. This is largely due to the thermal energy that these engines release into the environment through their cooling systems and especially through their exhausts.

Particularly for vehicle applications, in which the weight, bulk and cost of the engine play an important part, the energy released has until now been under-exploited. For example, the energy released at the exhaust is in the form of a low pressure gas with a relatively moderate temperature. The conversion of this released energy into mechanical energy by normal means involves heavy, bulky, costly machinery of debatable efficiency.

Solutions such as those described by U.S. Pat. No. 3,180,078 A, U.S. Pat. No. 4,121,423 A, DE 101 43 342 A1, JP 2004 270625 A, and U.S. Pat. No. 4,754,606 A do however propose hybrid heat-internal combustion engine solutions. However, none of these solutions is capable of overcoming all of these weight, bulk, cost and above all, efficiency constraints. Most of this prior art envisages compressing a working gas and then reheating it with recovered heat before expanding it. However, as the recovered heat is available at a temperature that is only slightly higher than the temperature of the working gas at the end of compression, this is an inefficient process.

The object of this invention is thus to propose a heat engine capable of efficiently converting thermal energy originating from a warm source, typically the waste heat released at the end of the internal combustion process, into mechanical energy, in particular in a manner compatible with the normal requirements of applications to vehicles.

According to the invention, the heat engine with external hot source in which the engine has at least one variable volume working chamber for a working gas, and a distribution mechanism that connects this chamber to a cold input from an energy receiving path during an outgoing transfer phase and to a hot output of the energy receiving path during an incoming transfer phase, the energy receiving path being intended to heat the working gas outside the chamber on contact with the external hot source, is characterised in that the distribution mechanism is timed in such a way as to:
maintain pressure in the energy receiving path;
during stable operation, connect the working chamber with the cold input of the energy receiving path whilst the pressure in the chamber is lower than the pressure in the energy receiving path.

The valve timing according to the invention is surprising as it allows working gas already located in the exchange path to flow back into the working chamber, following which the working gas that has flowed back and the working gas that has just been compressed must both be expelled in the exchange path. Consequently, at first glance this results in an increase in the negative work of the cycle. However, the working gas, which was slightly compressed before the chamber was connected to the cold input of the exchange path, is therefore at a relatively low temperature. Due to its low temperature, the working gas that has just been (relatively slightly) compressed is able to collect a relatively large quantity of thermal energy from the exhaust gases of the internal combustion engine, despite their relatively low temperature. It is therefore possible to almost multiply by two the absolute temperature of the working gas in the exchange path, and therefore multiply by two the volume of gas at the beginning of expansion relative to the volume of gas at the end of compression, for the same mass of working gas. The invention thus allows for a thermodynamic cycle to be produced in the heat engine with a relatively large area, therefore producing significant mechanical power.

Furthermore, the working gas at the end of expansion can be of a higher temperature than the working gas at the end of compression and at the beginning of the exchange path. This phenomenon allows for the working gas discharged by the heat engine piston to be used as a heat source for a first stage of the external heat source, in parallel or combined with the exhaust gases from the heat engine.

Due to this simple, low-cost solution, the heat engine is capable of improved nominal performance whilst allowing for lower weight and smaller bulk. It is therefore completely compatible with the normal demands of vehicle applications, and can be combined with the vehicle's internal combustion engine to form a hybrid engine.

This combination can be achieved in a preferred architecture of the hybrid engine in which the internal combustion engine comprises pistons coupled to a shaft of the hybrid engine, and the heat engine has at least one piston coupled to the shaft of the hybrid engine. The hot source of the heat engine is then supplied with heat energy by the exhaust of the internal combustion engine.

Due to this architecture, the general structure of a hybrid engine differs little from that of a conventional internal combustion engine, for example of a rod and crank type.

The bulk, weight and cost of the whole unit are compatible with current requirements, whilst the specific fuel consumption of the hybrid engine (quantity of fuel consumed per unit of power and unit of time) is particularly low.

In particular, the internal combustion engine and the heat engine can have a common engine block in which are formed cylinders of identical size, in which the pistons have strokes of identical length. It can also be envisaged that the diameter of the cylinders of the heat engine, and/or the stroke of its pistons, differ slightly from those of the internal combustion engine, even if the heat engine and the internal combustion engine have a common engine block.

For example, an engine with three cylinders can be envisaged, in which two cylinders belong to the internal combustion engine and one cylinder belongs to the heat engine, recovering and exploiting the exhaust energy from the two cylinders of the internal combustion engine.

Generally, the heat engine can operate with a suitable mass of working gas to absorb the heat energy that can be recovered in the exhaust of the internal combustion engine. This mass of working gas can be controlled by appropriate supercharging and/or by the selection of a two-stroke cycle, even if the internal combustion engine operates on a four-stroke cycle, and/or by a specific swept volume (displacement) for the heat engine.

In a preferred version, the heat engine comprises:
a working chamber delimited by the piston on the heat engine, which alternately causes chamber volume growth and reduction strokes;
a heat exchange path to heat a working gas outside the chamber, on contact with the external hot source;
a distribution mechanism to selectively close the working chamber and respectively selectively connect the working chamber with a working gas intake, a working gas discharge, a cold input of the exchange path and a hot output of the exchange path.

The exhaust gases from the internal combustion engine and/or the working gas discharged by the heat engine then preferably enter the turbine of a turbocharger. The compressor of the turbocharger supplies the intake of the heat engine and/or the intake of the internal combustion engine.

The internal combustion engine typically operates on an Otto cycle or a Diesel cycle.

It is advantageous that the valve timing be controllable, particularly to allow for initial pressurisation of the exchange path. To this end, the mass of gas sent to the exchange path on outgoing transfer must be greater than the mass of gas taken from the exchange path on incoming transfer until the exchange path reaches the desired pressure. The valve timing can also form part of a control system, for example a pressure controller in the exchange path.

The heat engine can operate on a two-stroke cycle in which the discharge phase, the compression phase and the outgoing transfer phase follow on from one another during a single chamber volume reduction stroke. The intake into the working chamber can then take place at relatively high pressure between the discharge phase and the compression phase, through supercharging producing relatively high pressure.

The heat engine can also operate on a four-stroke cycle. In this case, instead of corresponding to a brief phase between discharge and compression, the working gas intake can occupy a complete chamber volume growth stroke. During the next stroke, the reduction in the volume of the chamber, the compression phase is followed by the outgoing transfer phase.

During the next stroke, the incoming transfer phase is followed by the expansion phase, whilst the fourth stroke corresponds to the discharge of the working gas from the chamber.

Other features and advantages of the invention will become apparent from the following description, which relates to non-limitative examples.

In the attached drawings:

FIGS. 6A to 10B are all longitudinal cross-sections of the heat engine, along the plane A-A in FIG. 5 when the figure has a number followed by the letter A, and respectively along the plane B-B in FIG. 5 when the figure has a number followed by the letter B, in the following cycle phases:

FIGS. 6A and 6B: intake and scavenging phase;
FIGS. 7A and 7B: compression phase;
FIGS. 8A and 8B: outgoing transfer phase;
FIGS. 9A and 8B: incoming transfer phase;

FIGS. 10A and 10B: expansion phase;

Figure 1:
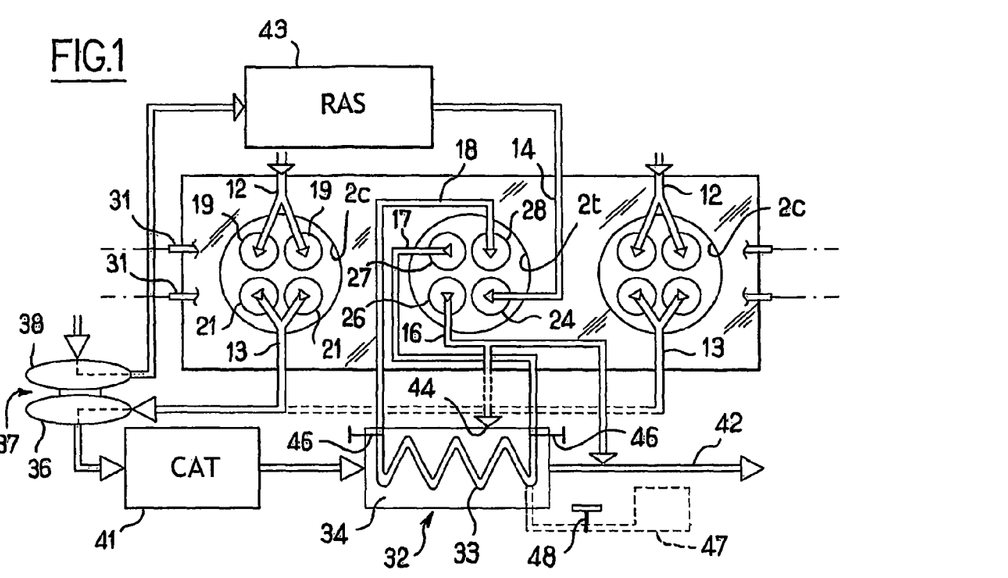
FIG. 1 is a schematic diagram of a hybrid engine according to the invention, with a 1 cylinder, two-stroke heat engine.
Figures 2, 3:
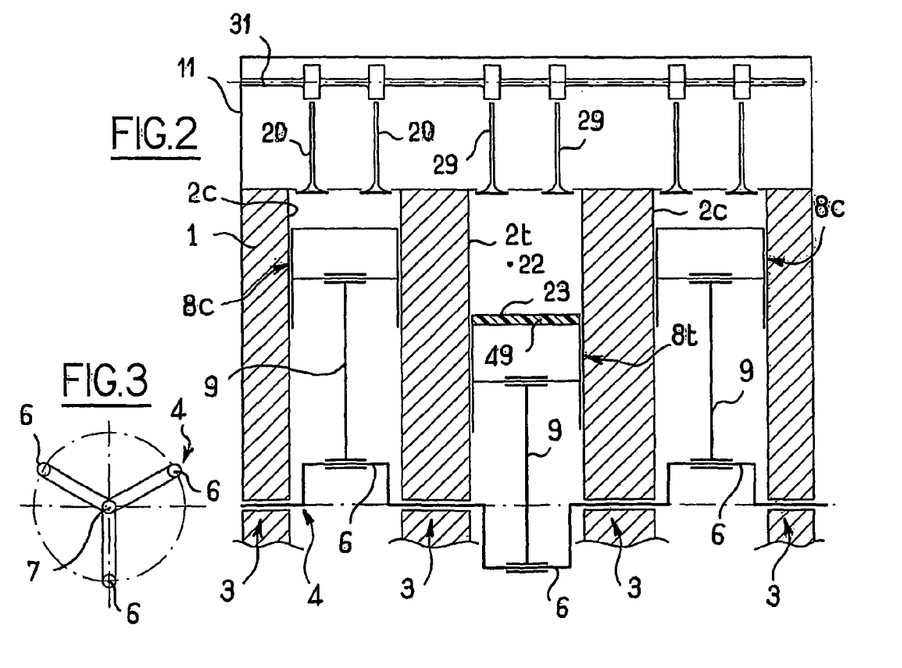
FIG. 2 is a diagrammatic longitudinal cross-sectional view of the engine in FIG. 1.
FIG. 3 is an end view of the crankshaft of the engine in FIGS. 1 and 2.

The example of a hybrid engine according to the invention shown in FIGS. 1 to 3 in an extremely diagrammatic manner comprises a common engine block 1 in which three parallel cylindrical bores, 2c, 2t are formed in a so-called "in-line" arrangement, that is, the axes of the bores are co-planar. According to the normal terminology, the cylindrical bores 2c, 2t are known as "cylinders". In its lower region, the engine block has bearings 3 aligned along an axis 7, which hold a crankshaft 4 that is common to all of the cylinders 2c, 2t. The crankshaft 4 comprises a journal 6 facing each of the cylinders 2c, 2t. As shown in FIG. 3, in this three-cylinder example, the journals 6 are distributed at an angle of 120° to each other, that is evenly, around the axis of rotation 7 of the crankshaft.

According to the invention, the hybrid engine brings together an internal combustion engine to which, in this example, the two cylinders 2c located at the ends are allocated, and a so-called "heat" engine according to the invention, to which the central cylinder 2t is allocated.

A sliding piston 8c is mounted in each of the cylinders 2c of the internal combustion engine. A sliding piston 8t is mounted in the cylinder 2t of the heat engine. Each piston 8c, 8t is connected to the corresponding journal 6 by a connecting rod 9 coupled on the one hand to the piston and on the other hand to the journal.

In the specific example described, the cylinders 2c and 2t have identical bore diameters and their working strokes are identical lengths (equal to twice the radius of eccentricity of the journals 6). They therefore have equal displacements (volume swept by each piston in its cylinder). Preferably, provision is made for the connecting rods 9 to be identical and the pistons 8c and 8t to have equal mass, so that the hybrid engine does not pose any particular dynamic balancing problems.

The engine block 1 is topped by a cylinder head 11 that is only very diagrammatically shown in FIG. 2. The cylinder head 11 comprises intake passages 12 and exhaust passages 13 for each of the cylinders 2c of the internal combustion engine, together with an intake passage 14, a discharge passage 16, an outgoing transfer passage 17 and an incoming transfer passage 18 for the cylinder 2t of the heat engine.

The internal combustion engine typically operates on a conventional Otto or Diesel cycle and, in the example shown, each cylinder of the internal combustion engine is associated with two intake ports 19 and two exhaust ports 21, each fitted with an intake or exhaust valve 20 respectively.

Each of the passages 14, 16, 17, 18 of the heat engine is associated with a port 24, 26, 27, 28 that opens the corresponding passage into the working chamber 22 of the heat engine, defined between the pressure face 23 of the piston 8t, the wall of the bore 2t and the lower face of the cylinder head 11. Each port 24, 26, 27, 28 is fitted with a valve 29. When the four valves 29 (only two are shown in FIG. 2) are closed, that is close the ports with which they are respectively associated, the working chamber 22 is hermetically sealed.

In the example shown, the valves 20 and 29 are as a whole aligned in two rows so that they are controlled by two camshafts 31, one of which is shown in FIG. 2, and the position of which is simply represented in FIG. 1. By conventional means, the camshafts 31 are coupled to the crankshaft 4 so that they rotate half as quickly as the crankshaft 4 in this example, in which the internal combustion engine operates on a four-stroke cycle.

The heat engine, corresponding to the central cylinder 2t, is associated with an external hot source 32 (FIG. 1) made up of a gas-gas heat exchanger comprising an energy receiving path 33 along which travels gas, generally air, that has been previously compressed in the working chamber 22 of the heat engine, and an energy supply path 34 along which gases travel which are mainly the exhaust gases from the internal combustion engine, therefore originating directly or indirectly from the exhaust passages 13 and the exhaust ports 21 associated with the bores 2c of the internal combustion engine. The exchanger forming the hot source 32 is a counterflow exchanger, that is, the gas originating from the bore 2t of the heat engine passes through the exchanger in the opposite direction to the exhaust gas from the internal combustion engine, as shown by the arrows in FIG. 1. The input of the energy receiving path 33, connected to the outgoing transfer port 27, is in thermal contact with the cold output of the path 34. The output of the energy receiving path 33, connected to the incoming transfer port 28, is in thermal contact with the hot input of the energy supply path 34.

In the example shown more particularly in FIG. 1, the internal combustion engine takes in atmospheric air and its exhaust is connected to the turbine part 36 of a turbocharger 37. At the output of the turbine 36 the exhaust gases from the internal combustion engine pass into a catalytic converter 41 before reaching the energy supply path 34 of the hot source 32. At the output of the hot source 32, the exhaust gases from the internal combustion engine are released into the atmosphere as shown by the arrow 42, generally through a silencer system, not shown.

The compressor part 38 of the turbocharger 37 takes in air from the atmosphere and sends compressed air to the intake port 24 of the heat engine, by means of a charge-air cooler (intercooler) 43.

The thermodynamic cycle of the heat engine in the example of a two-stroke engine will now be described with reference to FIG. 4.

Figure 4:
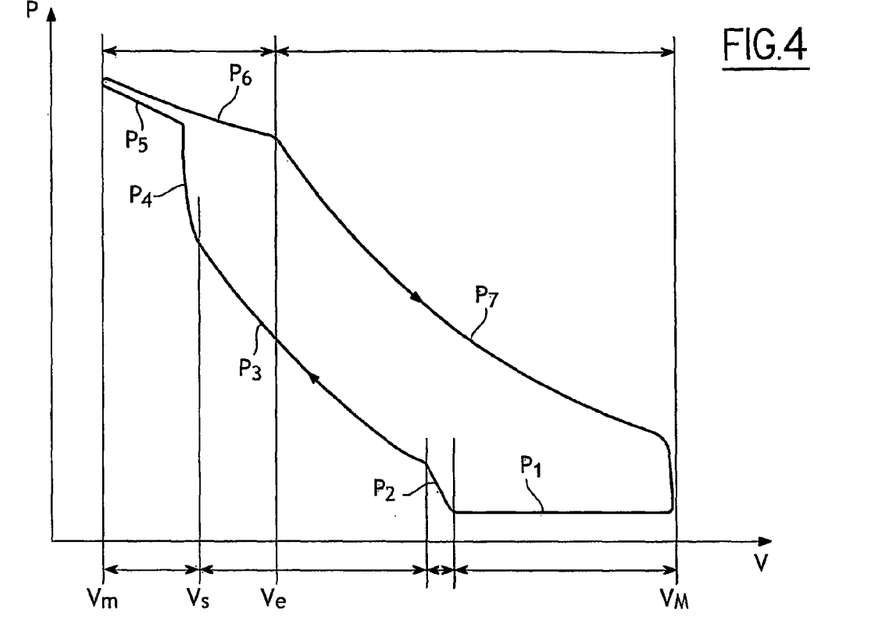
FIG. 4 is a diagram showing a two-stroke cycle of the heat engine of a hybrid engine according to the invention.

FIG. 4 shows on the vertical axis the pressure P in the working chamber 22 and on the horizontal axis the volume V of the working chamber as defined in a variable manner by the piston 8t.

It is a two-stroke cycle as all of the phases of the cycle take place in a single revolution of the crankshaft 4 and consequently in a single reciprocation of the piston 8t. The direction of travel of the cycle is indicated by arrows on the closed curve illustrating the cycle in FIG. 4. Starting from a position in which the working chamber 22 is at its maximum volume VM (position shown in FIG. 2 with the piston 8t as far away as possible from the cylinder head 11), the first phase P1 of the cycle is a discharge phase, illustrated in FIGS. 5A and 5B, in which the discharge port 26 is opened by the corresponding valve 29, whilst the other ports 24, 27, 28 are closed by their respective valves 29. The gas (air) contained in the working chamber 22 is discharged into the discharge passage 16 by the rising of the piston 8t. As shown in FIG. 1, the passage 16 can connect to the exhaust outlet 42 of the internal combustion engine. In a preferred variant, the passage 16 is connected to a branch 44 that opens into the energy supply path 34 of the hot source 32. The temperature of the exhaust gases decreases gradually along the path 34, from its input to its output. The branch 44 is a "warm" input positioned in an area where the temperature of the exhaust gases is between the temperature of the input and output of the path 34, and approximately equal to the temperature at which the gas is discharged from the heat engine.

More specifically, the temperature at the input of the energy supply path 34 can be 800° C., and it can be in the region of 200° C. at the output of that path. Along the path 34, the temperature of the exhaust gases therefore gradually decreases from 800° C. to 200° C. If the gases discharged by the heat engine have a temperature in the region of 300° C., the branch 44 is opened out into the area of the path 34 where the exhaust gases have a temperature of 300° C.

Figures 5, 5A:
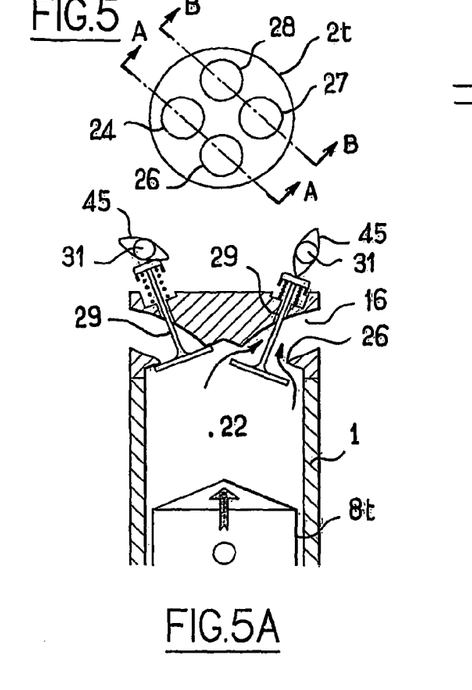
FIG. 5 is a diagrammatic axial view of the cylinder of the heat engine.
FIG. 5A is a vertical cross-sectional view of the heat engine of a hybrid engine according to the invention, along the plane A-A in FIG. 5, passing through the intake and discharge ports, during a discharge phase.
Figure 5B:
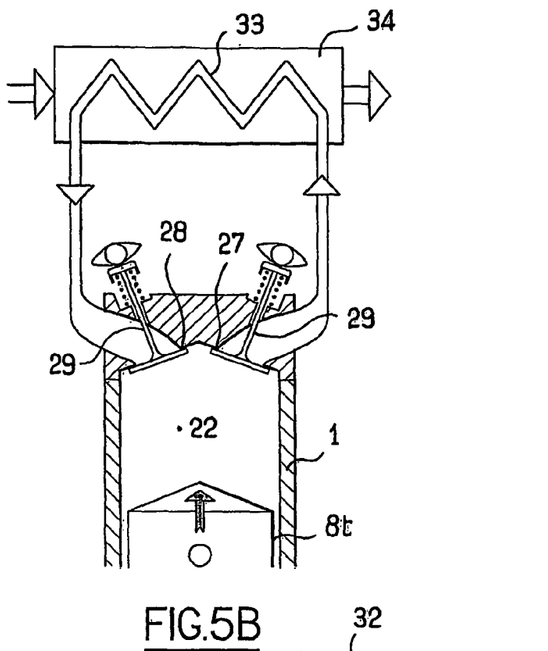
FIG. 5B is a similar view to that in FIG. 5A but the vertical cross-section is along the plane B-B in FIG. 5, passing through the outgoing transfer and incoming transfer ports of the heat engine, still during the discharge phase of the cycle.

Given that the camshafts 31 rotate half as quickly as the crankshaft 4 of the engine whilst the heat engine operates in this example of a two-stroke cycle corresponding to a single revolution of the crankshaft, a complete cycle of the heat engine corresponds to a half-revolution of the camshafts. This is why, as shown in FIGS. 5A and 5B, the cams 44 held by the camshafts 31 and associated with the heat engine are of a type with two diametrically opposed profiles to perform two operating cycles per revolution.

Figure 6A:
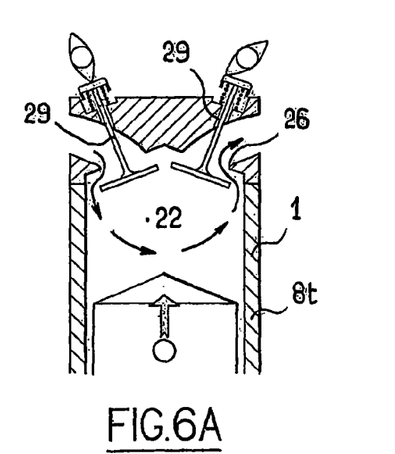
Figure 6B:
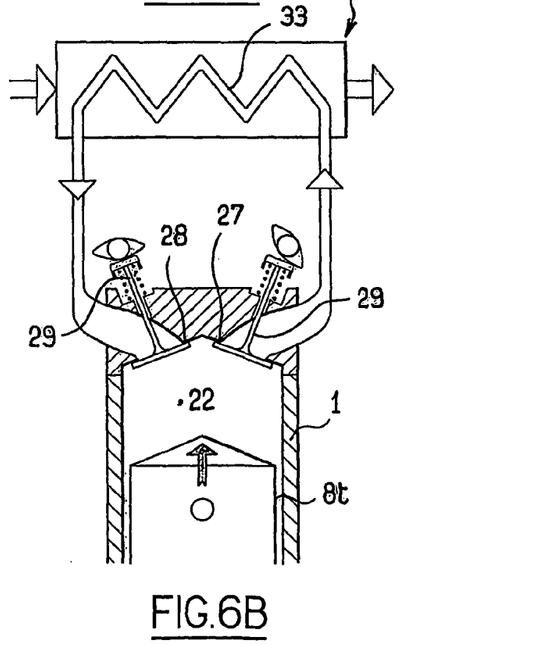

The discharge phase P1 is followed by an intake and scavenging phase P2 in which, as shown in FIGS. 6A and 6B, the intake 24 and discharge 26 ports are simultaneously opened by their respective valves 29 so that the air produced by the compressor part 38 of the turbocharger 37 enters the working chamber 22 and pushes the remaining exhaust gases out of it. During this time, the two transfer ports 27 and 28 are still closed by their corresponding valves 29.

Figures 7A, 7B:
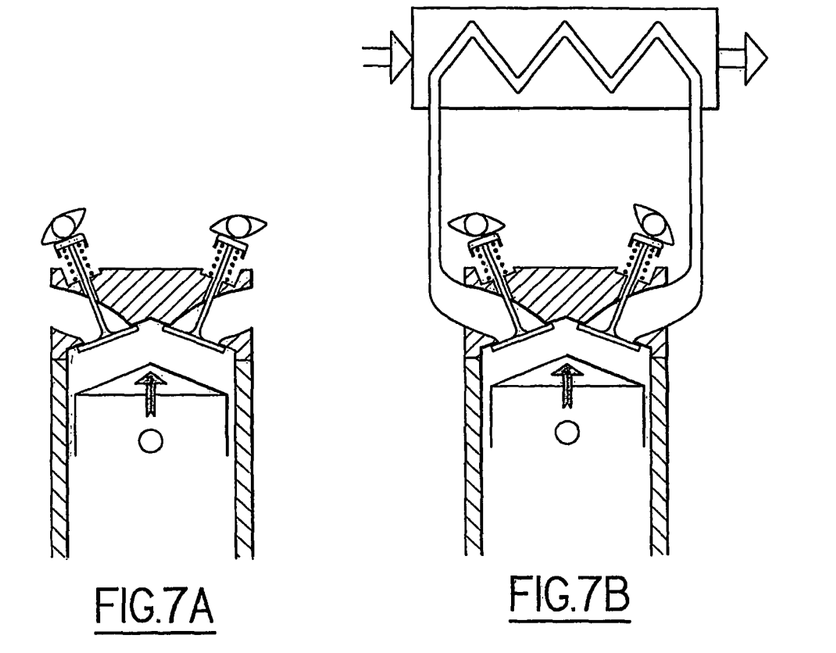

Phase P2 is followed by an adiabatic compression phase P3 (FIGS. 7A and 7B) in which the piston 8t continues its stroke towards the cylinder head 11, reducing the volume of the working chamber 22. During this compression phase, the four ports 24, 26, 27 and 28 are closed by their respective valves 29 and the working chamber 22 is hermetically sealed.

Figures 8A, 8B:
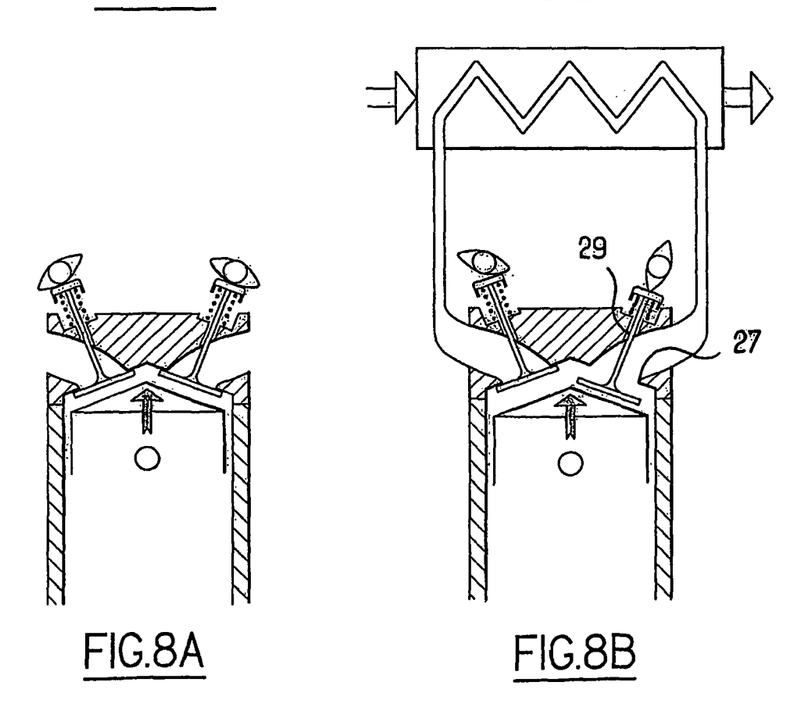

When the working chamber 22 reaches a volume Vs greater than its minimum volume Vm, the outgoing transfer port 27 (FIG. 8B) is opened by the corresponding valve 29, whilst the other ports remain closed. This results in a back-flow phase P4 during which pressurised gas contained in the energy receiving path 33 of the hot source 32 flows back into the working chamber 22, increasing the pressure in the working chamber 22. The volume of the energy receiving path 33 is much greater than the volume of the working chamber 22 in the back-flow phase. Consequently the back-flow takes place without any significant pressure drop in the energy receiving path 33. The temperature of the gas located in the path 33 near the outgoing transfer port 27 is at a temperature close to the temperature of the gas filling the working chamber 22 at the end of compression P3. Consequently, the pressure rise during the back-flow phase P4 corresponds essentially to a transfer of mass without any great thermal impact on the gas.

The back-flow phase P4 is followed by an outgoing transfer phase P5 during which the piston 8t continues its stroke until the working chamber 22 reaches its minimum volume Vm, whilst the gas present in the chamber 22 is expelled into the cold end of the energy receiving path 33. At this time, the pressure in the working chamber 22 increases slightly, on the one hand to propel the gas, and on the other hand to ensure the slight volumetric compression undergone by the gas in the total volume of the working chamber 22 and the energy receiving path 33, as this total volume is compressed as a whole by the movement of the piston 8t.

Figure 9A:
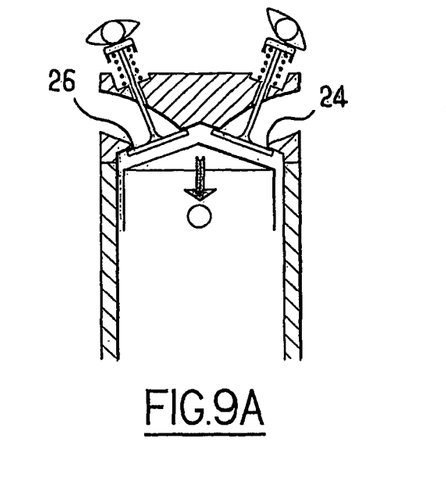
Figure 9B:
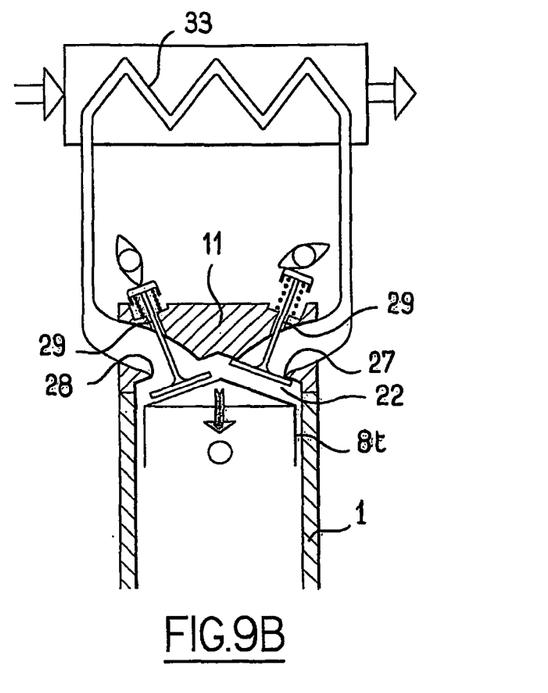

When the piston 8t reaches top dead centre (the closest position to the cylinder head 11), the outgoing transfer port 27 closes and the incoming transfer port 28 opens, through a corresponding movement of their respective valves 29 (FIG. 9B). During this time the intake 26 and discharge 24 ports remain closed. The pressurised gas originating from the hot end of the energy receiving path 33 enters the working chamber 22 through the port 28 during an incoming transfer phase P6 until the piston 8t reaches a position corresponding to a volume Ve of the working chamber 22 that is larger than the volume Vs at which the back-flow and outgoing transfer phases P4, P5 started.

The volume Ve is selected so that the mass of gas entering the working chamber 22 during phase P6 is equal to the mass expelled during the outgoing transfer phase P5. As the incoming gas is much hotter than the outgoing gas, this equal mass corresponds to a volume Ve larger than the volume Vs.

It is important to note that the cycle described and shown in FIG. 4 is theoretical. In practice, the valve controls can be shifted to optimise the actual cycle in view of the delay for setting gas in motion and the inevitably gradual opening and closing of the valves. For example, in reality, it may be necessary to start the back-flow P4 and outgoing transfer P5 phase earlier in the cycle to take into account the inertia of the gases during these movements in one direction and then the other. It is thus possible that in practice the opening point of the outgoing transfer port, identified by Vs in FIG. 4, moves closer to the closing point of the incoming transfer port, identified by Ve in FIG. 4, or even coincides with Ve, or even precedes it. Indeed, one of the novel features of the invention consists especially of opening the outgoing transfer orifice whilst the gas contained in the working chamber 22 has not yet been compressed to a value corresponding to that of the energy receiving path 33. Thus, the gas injected into the cold end of that path is at a remarkably low temperature. This allows for the recovery of more energy originating from the exhaust of the internal combustion engine, and even allows, as has been seen above due to the branch 44 (FIG. 1), for the recovery of energy originating from the heat engine discharge.

Figure 10A:
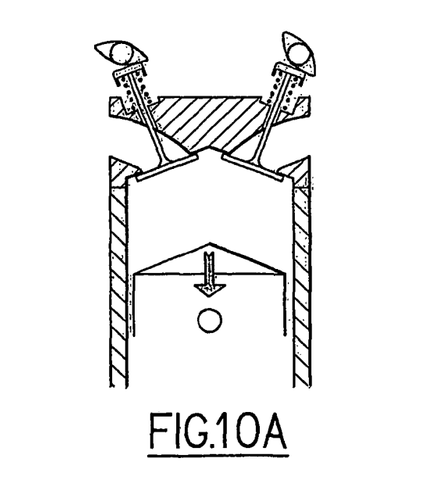
Figure 10B:
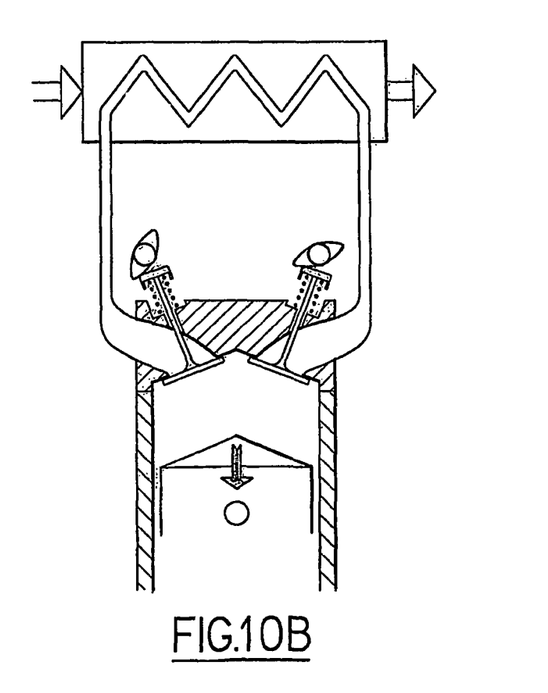

It is also possible that for a brief instant, the outgoing transfer 27 and incoming transfer 28 ports are open at the same time to achieve what is known as "valve overlap" (well known in four-stroke internal combustion engines at the end of the exhaust stroke and the start of the intake stroke). The incoming transfer phase P6 is followed by an adiabatic expansion phase P7, during which the piston 8t moves away from the cylinder head 11 until it reaches its position corresponding to the maximum volume VM of the working chamber 22. As shown in FIGS. 10A and 10B, the four ports are closed during this phase and the gas undergoes adiabatic expansion. The diagram in FIG. 4 clearly shows that the incoming transfer phase P6 and the expansion phase P7 together supply more mechanical energy to the piston 8t than it consumes to carry out phases P1, P2, P3, P4 and P5, during which it reduces the volume of the chamber 22 despite the opposite pressure in the chamber 22 during each of these phases. As is known by a person skilled in the art, this excess mechanical energy produced compared with the mechanical energy consumed can be seen by the fact that the pressure-volume diagram in FIG. 4 travels in a clockwise direction.

In the theoretical diagram in FIG. 4, it is assumed that the discharge port 26 opens when the volume of the working chamber 22 reaches its maximum value VM (bottom dead centre of the piston 8t). In practice, as is normal in heat engines with pistons in general, the opening of the exhaust port can occur at an earlier stage to give the pressure time to decrease at least partly before the piston starts its upwards stroke towards the cylinder head.

Figure 11:
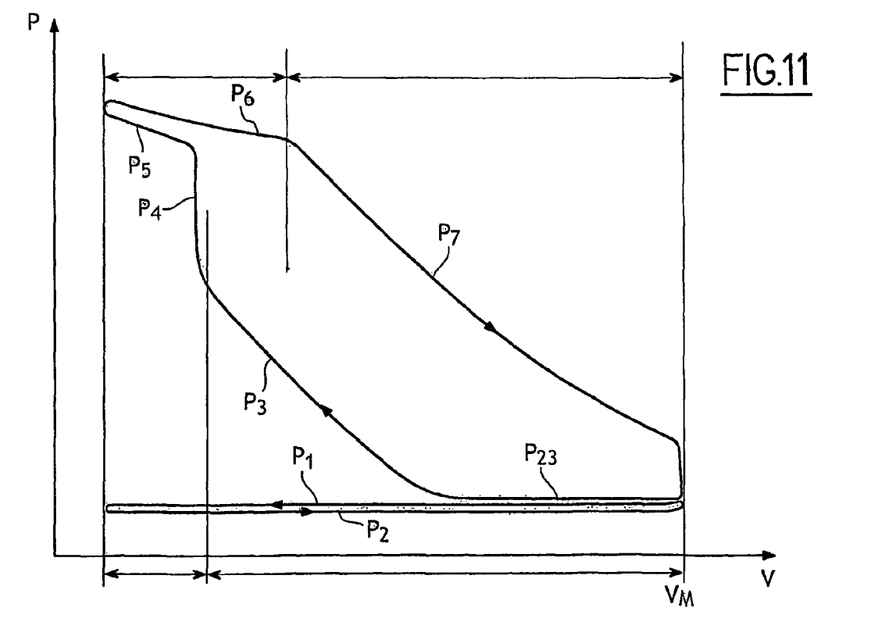
FIG. 11 is a similar diagram to FIG. 4, but showing a four-stroke cycle of the heat engine according to the invention.

FIG. 11 shows a four-stroke cycle for the heat engine of the hybrid engine according to the invention. In this case, the cycle requires two successive reciprocations of the piston St. One complete stroke of the piston 8t towards the cylinder head 11 is given over to exhaust (phase P1), the next complete stroke is given over to intake (phase P2) until the piston reaches bottom dead centre (volume VM). During the intake phase P2, the discharge port is closed. In the example shown in FIG. 11, intake takes place at atmospheric pressure. It is also possible and even preferable for intake to take place under pressure by means of a turbocharger such as 37 in FIG. 1, in which case the intake phase P2 will be located above the discharge phase P1 in FIG. 11.

The intake phase P2 is followed by a piston St rise phase P23 without compression. This effect can be obtained either by only closing the intake port at the end of phase P23, or conversely closing it before the end of phase P2, so that the end of phase P2 and phase P23 together form a neutralised reciprocation, on either side of bottom dead centre. Phase P23 is followed by adiabatic compression P3, back-flow P4, outgoing transfer P5, incoming transfer P6 and expansion P7 phases, which are substantially the same as in the two-stroke cycle shown in FIG. 4.

In a manner not shown, the cams 45 associated with the heat engine can be controlled angularly to adjust the pressure in the energy receiving path 33. For example, if the pressure in the path 33 falls below a lower threshold, the volume Ve at which the incoming transfer port closes is reduced in such a way that less gas can travel from the path 33 into the working chamber 22.

When the hybrid engine is started after a sufficiently extended stoppage, the mass of gas present in the path 33 decreases substantially due to leaks through the ports 24, 26, 27, 28. The ports are not always completely tight in the long term, even if the four valves 29 are in the closed position. The pressure controller in the path 33 automatically ensures the pressure rise in the path 33 when the hybrid engine is started. Even if a pressure controller is not provided, provision can be made for a pre-defined shifting of the closing point of the incoming transfer port during an initial phase of operation of the hybrid engine after each period of stoppage.

FIG. 1 shows two optional features that allow for a reduction in the pressure rise time of the path 33 when the hybrid engine is started. According to a first feature, the two ends of the path 33 can be closed by solenoid valves 46 when the hybrid engine is switched off.

According to an alternative or complementary feature, the path 33 is connected to a pressure accumulator 47 by means of a solenoid valve 48 that on the one hand is controlled to adjust the pressure level in the accumulator 47 when the hybrid engine has been operating for a certain amount of time (after correct pressurisation of the path 33) and on the other hand allows the accumulator 47 to recharge the path 33 with pressurised working gas (air) rapidly when the pressure in the path 33 is insufficient, particularly during the start-up of the hybrid engine after a period of stoppage.

The maximum temperatures in the heat engine are relatively low, in the region of 800° C., and can be withstood by appropriate materials, practically without the removal of heat by a cooling system. Thus, to improve the efficiency of the heat engine according to the invention, it is envisaged that at least some of the surfaces that define the working chamber 22 will be insulated. To this end, in FIG. 2 the pressure face 23 of the piston 8t is shown to be made up of the external face of a heat insulating coating 49. Such an insulator could also define the bore 2t, at least in its upper part adjacent to the cylinder head 11.

In normal internal combustion engines, heat is discharged equally through the cooling system, the lubrication system and the exhaust. According to the invention, it is envisaged that the discharge of heat from the internal combustion engine will preferably be through the exhaust, in order to optimise the recovery of energy by the heat engine.

Figure 12:
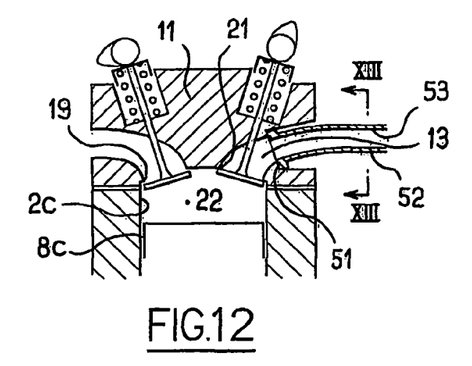
FIG. 12 is a partial vertical cross-sectional view of the top of the internal combustion engine according to the invention.
Figure 13:
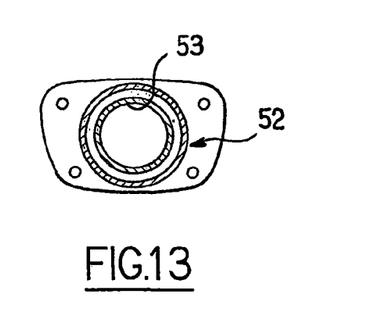
FIG. 13 is a cross-sectional view along the line XIII-XIII in FIG. 12.

To this end, as shown in FIGS. 12 and 13, provisions are made to reduce the quantity of heat that the exhaust gases from the internal combustion engine transmit to the cylinder head 11 and to its cooling system, not shown. To do this, the cylinder head 11 has a recess 51 the bottom of which is as close as possible to the exhaust port 21 in order to make the exhaust passage 13, which is formed in the cylinder head 11 and opens out into the bottom of the recess 51, as short as possible. An exhaust pipe 52 is fixed against the bottom of the recess 51. The inner passage 53 of the pipe 52 runs on from the passage 13 in the cylinder head. The pipe 52 is made for example from cast iron or even, preferably, is a double-walled steel passage as shown in FIG. 13.

In FIGS. 14 to 17, the internal combustion engine marked "ICE" and labelled 54 or 64, and the heat engine marked "HE" and labelled 55 or 65, are shown symbolically, together with their respective ports 19, 21, 24, 26, 27, 28.

Figure 14:
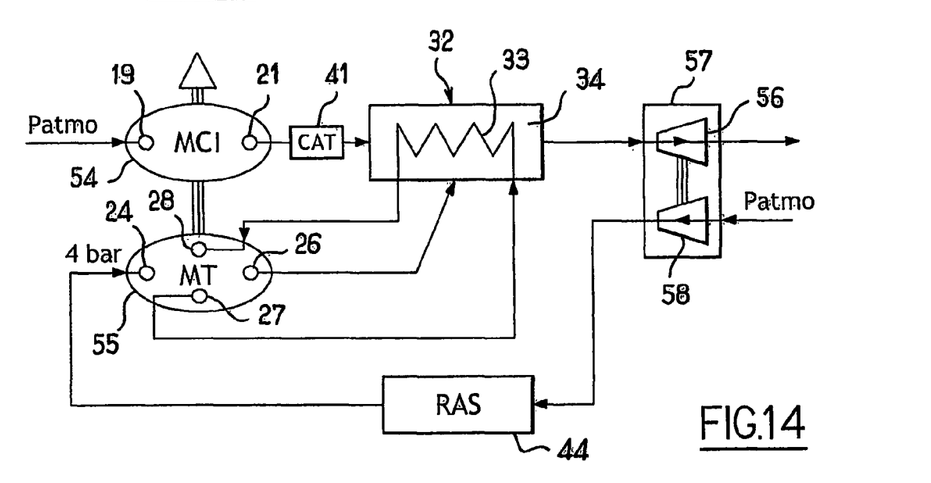
FIGS. 14 to 17 are diagrams of four possible configurations of hybrid engines according to the invention.

The configuration in FIG. 14 is appropriate for an engine with one heat cylinder and two or three internal combustion cylinders. It is similar to the configuration in FIG. 1, except that the turbine part 56 of the turbocharger 57 is mounted at the output from the energy supply path 34 of the hot source 32.

Generally, knowing the quantity of heat that can be recovered in the exhaust of the internal combustion engine, it is proposed in accordance with the invention that the displacement and supercharging pressure of the heat engine be selected so that the mass of working gas processed by the heat engine during each cycle corresponds substantially to the mass necessary to absorb the heat recoverable from the exhaust of the internal combustion engine. On a case by case basis, optimisation can consist of adapting the supercharging pressure of the heat engine, selecting an appropriate number of cylinders, selecting a two-stroke cycle or a four-stroke cycle, or selecting a different piston displacement for the heat engine from that of the cylinders of the internal combustion engine.

Figure 15:
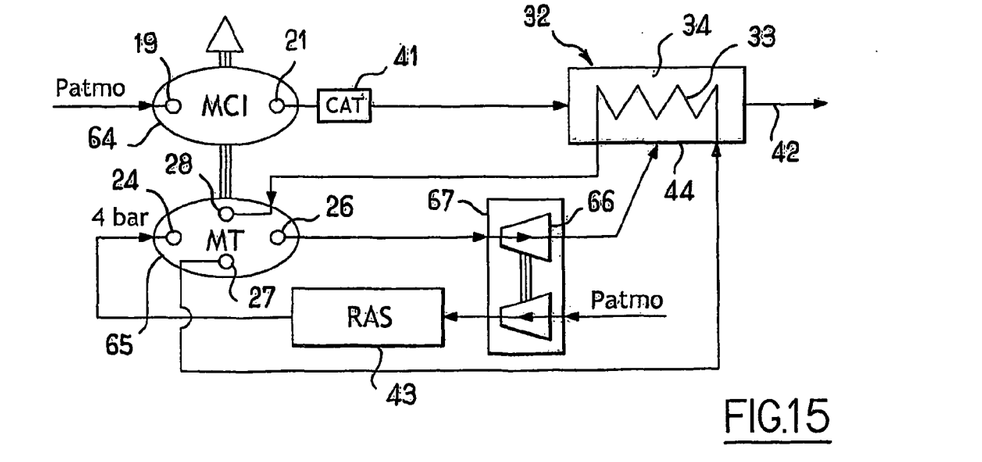

In the configuration shown in FIG. 15, which is appropriate for a hybrid engine comprising a two- or three-cylinder internal combustion engine 64 and a three-cylinder heat engine 65, the turbine part 66 of the turbocharger 67 is placed between the discharge port 26 of the heat engine and the branch 44 of the discharge in the energy supply path 34 of the hot source 32. This therefore has the advantage of freeing the exhaust of the internal combustion engine, that is, not restricting the exhaust with the presence of a turbocharger. This solution is easier to achieve when the heat engine has multiple cylinders as the pressure in its discharge is pulsed less heavily and thus allows for improved operation of the turbocharger.

Figure 16:
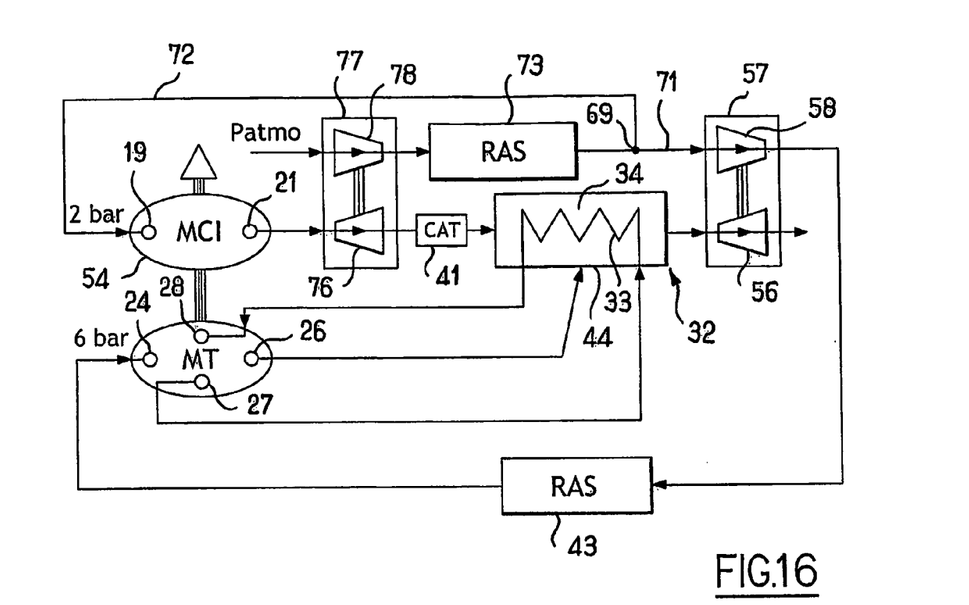

FIG. 16 shows a configuration that is appropriate for a six-cylinder hybrid engine comprising a three-cylinder internal combustion engine and a three-cylinder heat engine. This configuration will be described with regard to its differences in relation to the configuration in FIG. 14. The turbocharger 57 comprises a compressor part 58 that is supplied not with atmospheric air but with air that has already been compressed once in the compressor part 78 of a first turbocharger 77. The turbine part 76 of the turbocharger 77 is installed between the exhaust port 21 of the internal combustion engine and the catalytic converter 41. The charge air produced by the compressor part 78 passes through a charge-air cooler (intercooler) 73 and then reaches a fork 69 at which some of the compressed air goes to the compressor part 58 of the turbocharger 57 through a branch 71, and some of the air is sent to the intake 19 of the internal combustion engine 54 through a passage branch 72.

Figure 17:
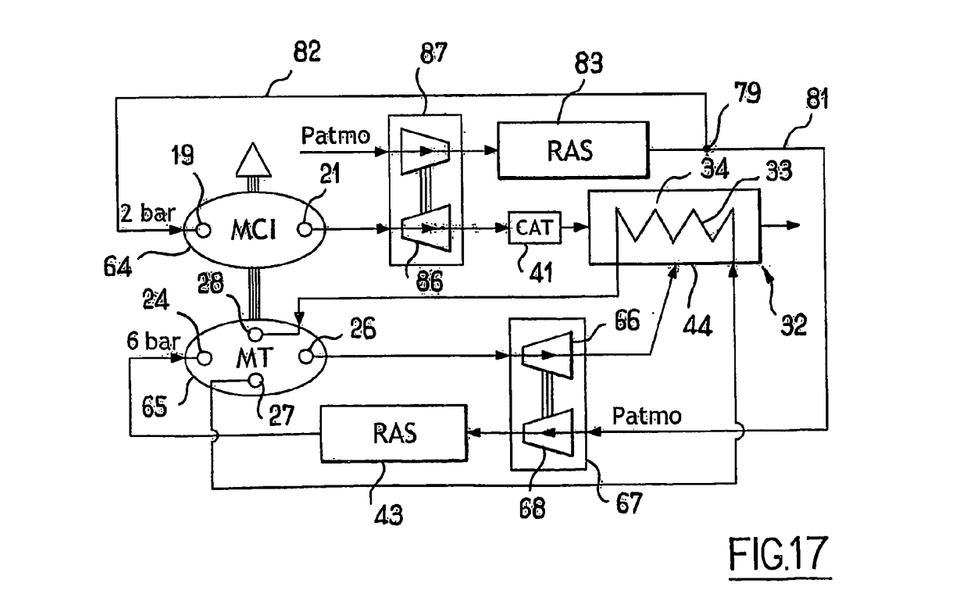

The configuration in FIG. 17 is appropriate for a six-cylinder hybrid engine comprising a three-cylinder internal combustion engine and a three-cylinder heat engine. This configuration will be described with regard to its differences in relation to the configuration in FIG. 15. The turbocharger 67 comprises a compressor part 58 that is supplied not with atmospheric air but with air that has already been compressed once in the compressor part 88 of a first turbocharger 87. The turbine part 86 of the turbocharger 87 is installed between the exhaust port of the internal combustion engine and the catalytic converter 41. The charge air produced by the compressor part 88 passes through a charge-air cooler (intercooler) 83 and then reaches a fork 79 at which some of the compressed air goes to the compressor part 68 of the turbocharger 67 through a branch 81, and some of the air is sent to the intake 19 of the internal combustion engine 64 through a passage branch 82.

Thus, in each of the embodiments in FIGS. 16 and 17, the air supplying the internal combustion engine is compressed once so that it has an effective pressure of for example 0.2 MPa (2 bar) whilst the air sent to the intake 24 of the heat engine is compressed twice to reach an effective pressure of for example 0.6 MPa (6 bar).

Of course, the invention is not limited to the examples of embodiments that have just been described.

The invention relates to all types of heat engine, and is not restricted to a hot source originating from an internal combustion engine.

In the case of a hybrid engine, the internal combustion engine and the heat engine can have separate engine blocks. The heat engine can be envisaged as a separate entity that can be fitted to existing internal combustion engines, or another source of moderate heat.

The invention applies to all types of internal combustion engine, even engines with a large number of cylinders. In particular, the invention is particularly advantageous in engines for heavy goods vehicles and ships, and also in fixed engines when the heat released by an internal combustion engine is not recoverable or fully recoverable for uses other than the engine.

The efficiency of the hybrid engine according to the invention is greatly improved compared to the efficiency of a conventional internal combustion engine. The additional weight and cost and the reduction in specific power output (power per cubic decimeter of displacement) are completely acceptable for most applications, particularly on vehicles, including touring vehicles such as private cars. The industrial investment envisaged is limited. For example, a conventional engine block for an internal combustion engine can be used, in which one or more cylinders will be allocated to the heat engine.

As the external faces of the valves associated with the transfer ports 27 and 28 are subject to the pressure of the path 33, which tends to open these valves, it can be advantageous to produce them in the form of pressure-balanced valves, for example according to EP 0 897 059 A2.

The invention claimed is:

1. A heat engine comprising:
an external hot source having an energy supply path, wherein the engine comprises a working member and at least one variable volume working chamber for a working gas, and a distribution mechanism that connects this chamber to a cold input of an energy receiving path during an outgoing transfer phase and to a hot output of the energy receiving path during an incoming transfer phase, the energy receiving path cofirgured to heat the working gas outside the chamber on contact with the external hot source, wherein the cold input of the energy receiving path is in thermal contact with a cold output of the energy supply path, and wherein the distribution mechanism is configured to:
maintain a pressure in the energy receiving path;
during stable operation, connect the working chamber with the cold input of the energy receiving path while a pressure in the chamber is lower than a pressure in the energy receiving path.

2. The heat engine according to claim 1, further comprising a pressure accumulator that is selectively connected to the energy receiving path of the hot source to accumulate a reserve of pressurised gas during stable operation and at least partly return this reserve when the engine is restarted after a period of stoppage.

3. The heat engine according to claim 1, further including controllable valve timing in particular to allow for initial pressurisation of the energy receiving path and/or to control the pressure in the energy receiving path.

4. The heat engine according to claim 1, wherein at the start of an outgoing transfer phase the chamber has a smaller volume than its volume at the end of the incoming transfer phase.

5. The heat engine according to claim 1, wherein at least one surface delimiting the working chamber, particularly a pressure face of the piston, is defined by a heat insulating coating.

6. The heat engine according to claim 1, wherein the heat engine operates on a two-stroke cycle in which a discharge phase, a compression phase and the outgoing transfer phase follow on from one another in a single chamber volume reduction stroke.

7. The heat engine according to claim 6, wherein an intake into the working chamber takes place under pressure between the discharge phase and the compression phase.

8. The heat engine according to claim 1, wherein the heat engine operates on a four-stroke cycle comprising: a chamber volume growth stroke for a working gas intake phase a chamber volume reduction stroke for the working gas compression phase followed by the outgoing transfer phase; a chamber volume growth stroke for an incoming transfer phase then an expansion phase; and a chamber volume reduction stroke for a working gas discharge phase.

9. The heat engine according to claim 1, wherein: the working chamber is delimited by a piston, which alternately causes chamber volume growth and reduction strokes; the distribution mechanism is designed to selectively close the working chamber and respectively selectively connect the working chamber with a working gas intake, a working gas discharge, the cold input of the energy receiving path and the hot output of the energy receiving path; and in that the distribution mechanism connects the chamber with the cold input during the outgoing transfer phase after the compression phase of the working gas in the working chamber, and with the hot output during an incoming transfer phase that precedes an expansion phase.

10. The heat engine according to claim 1, wherein the distribution mechanism is timed so that at the end of an expansion phase, the chamber has a volume larger than its volume at the start of a compression phase.

11. The heat engine according to claim 1, wherein a discharge of the heat engine is connected to a warm input of the external hot source, the temperature of the warm input being between the temperature of an energy supply path at the input of the hot source, and the temperature at which the energy supply path leaves the hot source.

12. A heat engine according to claim 1, wherein the energy supply path is supplied with energy by an exhaust of an internal combustion engine.

13. The heat engine according to claim 12, further including an insulation of the exhaust of the internal combustion engine over at least part of its path between an exhaust port adjacent to a combustion chamber on the one hand and a hot input of the exhaust gas into the hot source on the other hand.

14. A hybrid engine comprising a heat engine according to claim 1 and an internal combustion engine an exhaust of which supplies the energy supply path of the hot source of the heat engine.

15. The hybrid engine according to claim 14, wherein the hot source comprises for the energy supply path an output connected to the input of a turbocharger turbine.

16. The hybrid engine according to claim 14, further including a turbine is inserted between the discharge of the heat engine and a warm input of the external hot source, the temperature of the warm input being between the temperature of the energy supply path at the input of the hot source, and the temperature at which the energy supply path leaves the hot source.

17. The hybrid engine according to claim 14, wherein the discharge of the heat engine is connected to the input of a turbocharger turbine.

18. The hybrid engine according to claim 15, wherein the turbocharger comprises a compressor the output of which is connected to the intake of the heat engine.

19. The hybrid engine according to claim 15, wherein the turbocharger is a second turbocharger, the compressor input of which is connected to the compressor output of a first turbocharger with a turbine through which the energy supply path passes upstream of the hot source.

20. The hybrid engine according to claim 19, wherein the turbine output of the first turbocharger is connected at least indirectly to the hot input of the hot source.

21. The hybrid engine according to claim 19, wherein the compressor output of the first turbocharger is also connected to the intake of the internal combustion engine.

22. The hybrid engine according to claim 14, wherein at least one piston of the heat engine is coupled to a shaft, the internal combustion engine also comprising at least one piston coupled to the shaft.

23. The hybrid engine according to claim 14, wherein the internal combustion engine and the heat engine have a common engine block.

24. The hybrid engine according to claim 22, wherein the at least one piston of the heat engine and the at least one piston of the internal combustion engine have same pressure face areas and stroke lengths.

25. The hybrid engine according to claim 22, wherein said at least one piston of the heat engine has a pressure face area and a stroke length at least one of which is different from a pressure face area and a stroke length, respectively, of said at least one piston of the internal combustion engine.

26. The hybrid engine according to claim 14, wherein the internal combustion engine operates on a four-stroke cycle and the heat engine on a two-stroke cycle.

* * * * *